United States Patent [19]

Nakashima et al.

[11] Patent Number: 4,783,631
[45] Date of Patent: Nov. 8, 1988

[54] APPARATUS FOR DETECTING DISCONNECTION OF A SPEED SENSOR AND ELIMINATING OXIDE FILM FROM THE SENSOR'S CONNECTORS

[75] Inventors: Noriyuki Nakashima, Nagoya; Kimio Tamura, Anjo; Nobuhiko Makino, Kariya; Kunimi Masuto, Nagoya, all of Japan

[73] Assignee: Nippondenso Co., Ltd., Kariya, Japan

[21] Appl. No.: 896,006

[22] Filed: Aug. 13, 1986

[30] Foreign Application Priority Data

Aug. 16, 1985 [JP] Japan .................. 60-180194

[51] Int. Cl.[4] .................. G01R 31/04; G01P 3/00
[52] U.S. Cl. .................. 324/538; 324/500; 324/160; 340/52 R
[58] Field of Search .............. 324/502, 503, 511, 522, 324/527, 543, 546, 555, 556, 160-162, 538; 364/426; 340/52 F, 52 B; 303/92, 116

[56] References Cited

U.S. PATENT DOCUMENTS

| | | | |
|---|---|---|---|
| 3,680,923 | 8/1972 | Peterson et al. | 324/503 X |
| 3,911,392 | 10/1975 | Fleagle | 340/52 B |
| 4,016,457 | 4/1977 | Frait | 324/503 X |
| 4,061,402 | 12/1977 | Peterson et al. | 340/52 B X |
| 4,485,444 | 11/1984 | Maruyama et al. | 340/52 B X |

FOREIGN PATENT DOCUMENTS 48-11189 4/1973 Japan .

Primary Examiner—Reinhard J. Eisenzopf
Assistant Examiner—Jack B. Harvey
Attorney, Agent, or Firm—Cushman, Darby & Cushman

[57] ABSTRACT

An apparatus for detecting a disconnection of a sensor by monitoring a signal in a signal-carrying line for receiving an output signal of the sensor through a connector. The apparatus includes a feeder circuit for causing a current to flow through the connector to the sensor for a predetermined time period in the absence of the output signal of the sensor. The current flow causes elimination of an oxide film produced in the connector with time, resulting in the prevention of attenuation of the output signal due to the oxide film and in ensuring accurate detection of the disconnection of the sensor irrespective of secular change.

9 Claims, 7 Drawing Sheets

APPARATUS FOR DETECTING DISCONNECTION OF A SPEED SENSOR AND ELIMINATING OXIDE FILM FROM THE SENSOR'S CONNECTORS

BACKGROUND OF THE INVENTION

The present invention relates generally to the detection of an abnormality of a sensor, and more particularly to an apparatus for detecting failures of a sensor such as a disconnection of a pickup coil, and is applicable particularly, but not exclusively, to a control system for use in a motor vehicle.

Generally, control systems such as an anti-skid control apparatus for use in a motor vehicle are arranged to control the vehicle on the basis of the output signals of sensors such as a rotational speed sensor. Failures such as disconnection of the rotational speed sensor result in difficulty in ensuring appropriate vehicle control. In order to solve this problem, the control system is provided with an apparatus for detecting failures of the rotational speed sensor. One example of such an apparatus is illustrated in FIG. 6 wherein a monitoring circuit 5 for detection of disconnection is provided, which monitors a signal in a signal-carrying line 4 coupled through a connector 1 to an output line 3 of a pickup coil 2 of a sensor. The monitoring circuit 5, for example, is arranged as shown in FIG. 7. Another known arrangement is disclosed in Japanese patent application No. 48-11189, the teachings of which involve the detection of a short-circuit of a pickup coil of a sensor in addition to disconnection thereof.

Such prior art systems have been disadvantageous, however, in that the connector presents a resistance against the output current of the pickup coil due to an oxide film that accumulates over time, and the attenuation of the output current results in the fact that a difficulty is encountered to meet the requirements imposed in high precision detection of failures of a rotational speed sensor such as disconnection.

SUMMARY OF THE INVENTION

It is therefore an object of the present invention to provide a new and improved system for detecting failures of a sensor which overcomes the above-described disadvantage inherent in the prior art systems.

More specifically, the present invention provides a failure detection system which is capable of eliminating the oxide film produced in the connector or preventing the production thereof and thus accurately steadily detecting the abnormality of a sensor irrespective of secular change.

The technique of the present invention involves the provision of a device which causes a current to flow through the connector coupled to a sensor for a predetermined time period in the absence of the output signal of the sensor. The current flow provides for elimination of an oxide film produced in the connector or prevention of production of the oxide film, resulting in improving the reliability for detection of failures of the sensor due to no attenuation of the output signal of the sensor.

An apparatus for detecting failures of a sensor according to the present invention therefore comprises a monitoring circuit coupled to a signal-carying line receiving the output signal of the sensor through a connector for monitoring a signal in the signal-carrying line to determine the failure of the sensor and a feeder circuit coupled to the signal-carrying line for feeding current to the connector. The feeder circuit is controlled by a control circuit such that the current flows through the connector for a predetermined time period in the absence of the output signal of the sensor.

Preferably, the control circuit has a function for detecting an abnormal operation of the feeder circuit because of preventing the current from being fed to the connector in the presence of the output signal of the sensor. The introduction of current to the signal-carrying line would distort the measurement of the sensor.

When the apparatus according to the present invention is adapted for a rotational speed sensor of a control system of a motor vehicle such as an anti-skid control system, the feeder circuit will be controlled so as to cause the current to flow for a predetermined time period in response to the turning-on of an ignition switch of the vehicle during a stop of the vehicle, i.e., in the absence of the output signal of the rotational speed sensor.

BRIEF DESCRIPTION OF THE DRAWINGS

The object and features of the present invention will become more readily apparent from the following detailed description of the preferred embodiments taken in conjunction with the accompanying drawings in which.

DETAILED DESCRIPTION OF THE INVENTION

Figure 1:
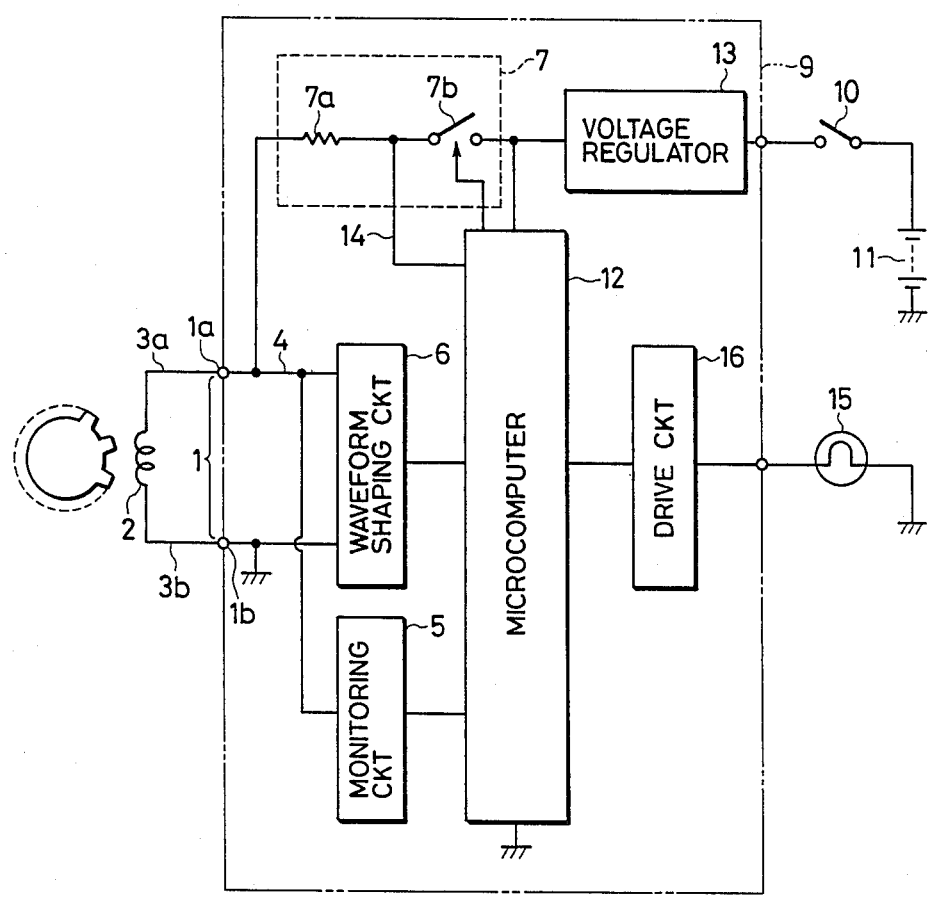
FIG. 1 is a schematic block diagram showing an apparatus for detecting failures of a rotational speed sensor according to a first embodiment of the present invention.

Referring now to FIG. 1, there is provided a system for detecting failures of a rotational speed sensor for use in a motor vehicle according to the present invention which comprises a control unit 9 coupled through a connector 1 to output lines 3a and 3b of a pickup coil 2 of the sensor and powered through a ignition switch 10 by a battery 11.

A detection signal from the pickup coil 2 is supplied through the connector 1 and a signal-carrying line 4 to a waveform shaping circuit 6 and a feeder circuit 7. The feeder circuit 7 comprises a resistor 7a and a switch 7b operated in response to a drive signal from a microcomputer 12. When the switch 7b is set to the on-condition, a current is applied from a voltage regulator 13 through the resistor 7a to one conductor portion (or terminal) 1a of the connector 1. The magnitude of the current is several tens times as large as that (approximately 40 A) of a signal normally outputted from the pickup coil 2. The switch 7b is set to the on-condition until a predetermined time period is elapsed after the ignition switch 10 is turned on.

The microcomputer 12 is coupled through a signal-carrying line 14 to a line between the resistor 7a and the switch 7b in order to check the operating condition of the feeder circuit 7 on the basis of a signal in the signal-carrying line 14. When the switch 7b is detected to be set to the on-condition at the time that it is controlled to be in the off-condition, the microcomputer 12 performs a predetermined operation, for example, stoppage of the anti-skid control.

Figure 6:
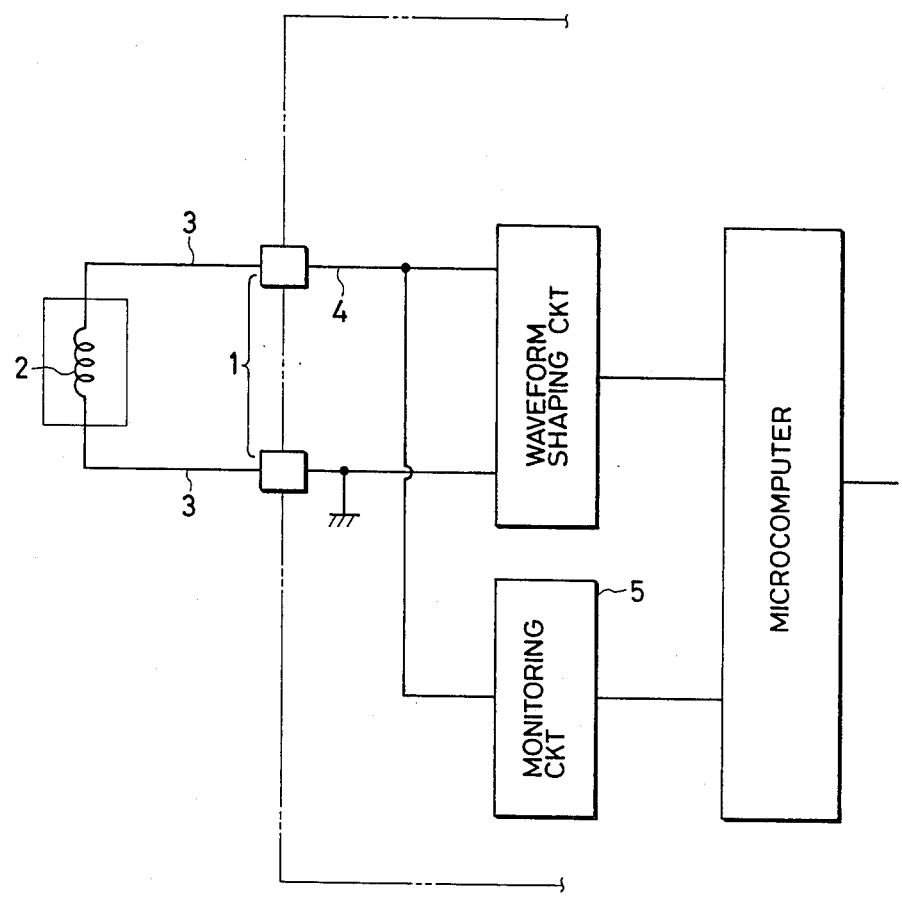
FIG. 6 is a schematic illustration of a conventional apparatus for detecting failures of a sensor.
Figure 7:
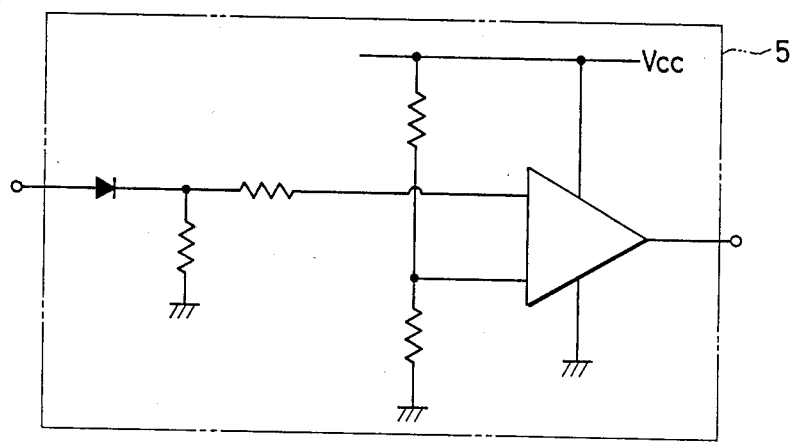
FIG. 7 is an illustration of a circuit arrangement of the monitoring circuit of FIG. 6.

The control unit 9 includes a monitoring circuit 5 for detecting a disconnection of the pickup coil 2. This monitoring circuit 5 may have the same construction as that of FIG. 6 showing a conventional disconnection detecting apparatus and the microcomputer 12 generates a control signal in response to a detection signal from the monitoring circuit 5. The control signal from the microcomputer 12 is supplied to a drive circuit 16 which in turn lights lamp 15 to indicate disconnection.

Figure 2:
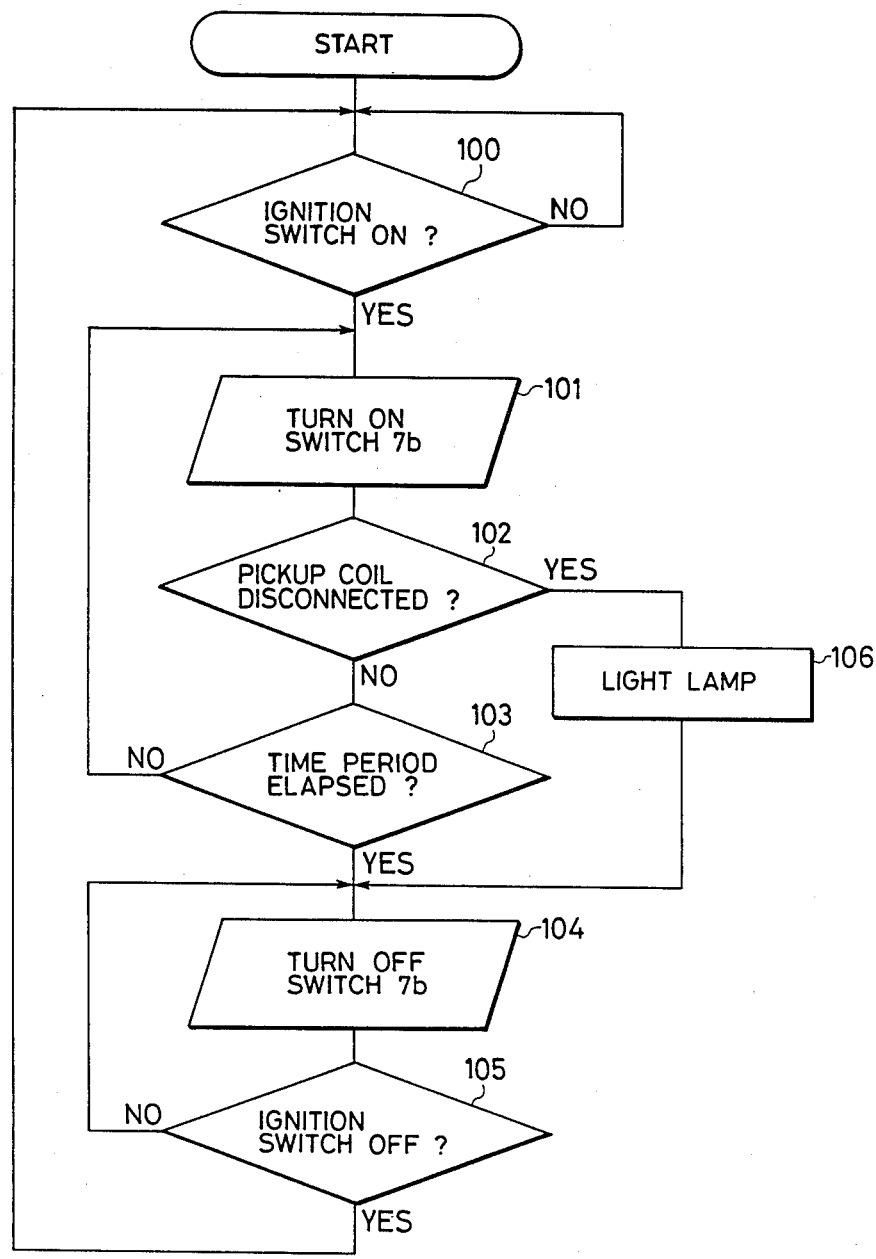
FIG. 2 is a flow chart of the program provided for the apparatus of FIG. 1.

FIG. 2 is a flow chart showing a program executed by the microcomputer 12.

The program execution starts with a step 100 which is provided to check whether the ignition switch 10 is set to the closed condition. If so, a drive signal is generated to turn on the switch 7b (step 101). In response to the switch 7b being turned on, the voltage regulator 13 causes a current to flow through the switch 7b, resistor 7a, signal-carrying line 4, the conductor portion 1a of the connector 1, output line 3a, pickup coil 2 and output line 3b to ground.

The step 101 is followed by a step 102 to check whether the pickup coil 2 is disconnected. This decision is made on the basis of a detection signal from the monitoring circuit 5. The input voltage of the monitoring circuit 5 becomes high-level when the pickup coil 2 is disconnected and becomes low-level when it is normal, and therefore the monitoring circuit 5 generates a detection signal indicative of failures such as disconnection in response to the high-level input voltage.

In the absence of a disconnection-detection signal, control goes to a step 103 in which it is checked to see whether a predetermined time period has elapsed from the time that the switch 7b is set to the closed condition. If not, the operational flow returns to the step 101, that is, the steps 101, 102 and 103 are repeatedly executed until the predetermined time period is elapsed, provided that a disconnection does not occur.

In response to the elapse of the predetermined time period, control advances to a step 104 to turn off the switch 7b to stop the feeding of the current toward the connector 1 and then reachs a step 105 in which it is checked to see whether the ignition switch is set to the off-condition. If not, control returns to the step 104 to keep the switch 7b to the closed condition. If so, the operational flow returns to the first step 100.

On the other hand, If the answer of the step 102 is YES, that is, when a detection signal indicative of disconnection is supplied from the monitoring circuit 5 to the microcomputer 12, the operational flow goes to a step 106 to light the lamp 15 and then goes to the step 104 to set the switch 7b to the off-condition.

It will be understood from the above-description that the switch 7b is basically closed for the predetermined time period after the ignition switch 10 is turned on and therefore a current flows through the connector 1, resulting in preventing the production of oxide film or eliminating the oxide film.

Figure 3:
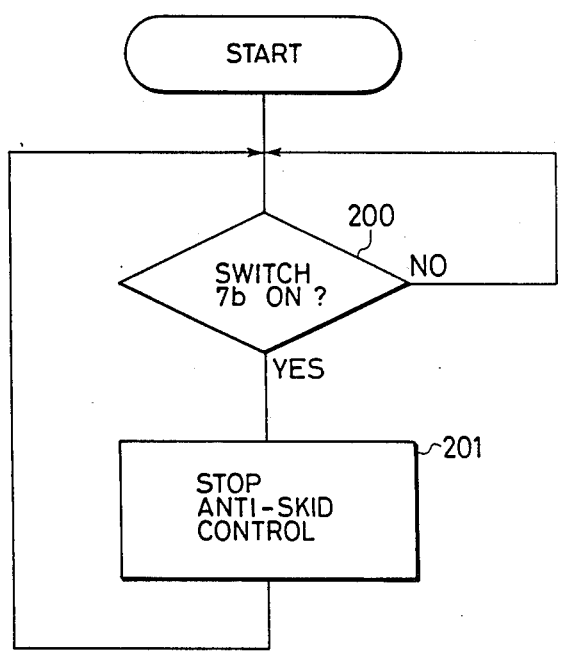
FIG. 3 is a flow chart describing the function for detecting an abnormal operation of a feeder circuit of FIG. 1 apparatus.

Furthermore, the microcomputer 12 executes the operation shown in FIG. 3 while the switch 7b is turned off in the step 104 of the routine of FIG. 2. A step 200 is provided for checking the condition of the switch 7a on the basis of a current passing through the signal-carrying line 14, that is, it is checked whether the switch 7b is actually set to the off-condition. The step 200 is repeatedly performed while the switch 7b is set to the off-condition. On the other hand, when the switch 7b is switched to the on-condition due to, for example, failures of the switch 7b, the step 200 is followed by a step 201 in which the microcomputer 12 performs control such that, for example, an anti-skid control is terminated or is not started. This is for the purpose of preventing a control error due to the abnormal operation of the switch 7b.

Figure 4:
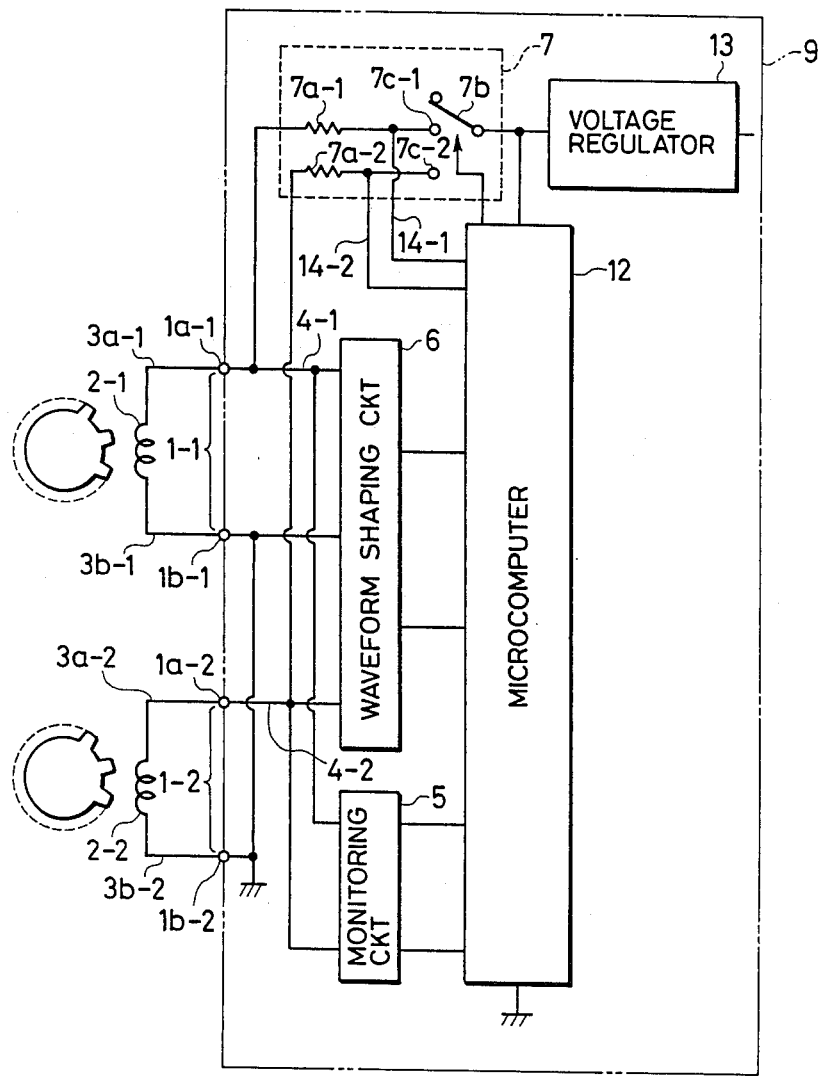
FIG. 4 is an illustration of an apparatus for detecting failures of two rotational speed sensors according to a second embodiment of the present invention.

A further embodiment of the present invention is illustrated in FIG. 4. This embodiment relates to the detection of failures in terms of two pickup coils.

In the figure, a pickup coil 2-1 is coupled through output lines 3a-1, 3b-1, a connector 1-1, a signal-carrying line 4-1 to a waveform shaping circuit 6. On the other hand, another pickup coil 2-2 is coupled through output lines 3a-2, 3b-2, a connector 1-2, a signal-carrying line 4-2 to the waveform shaping circuit 6. A monitoring circuit 5 for detecting failures of the pickup coils 2-1 and 2-2 is connected to the signal-carrying lines 4-1 and 4-2. A feeder circuit 7 is also coupled to the the signal-carrying lines 4-1 and 4-2, and comprises a resistor 7a-1 coupled to the signal-carrying line 4-1 and a resistor 7a-2 coupled to the line 4-2. The feeder circuit 7 further includes a switch 7b connected to a voltage regulator 13 and having a contact 7c-1 connected to the resistor 7a-1 and a contact 7c-2 connected to the resistor 7a-2, the operation of the switch 7b being controlled in accordance with a signal from a microcomputer 12. The microcomputer 12 is coupled through lines 14-1 and 14-2 to a line between the resistor 7a-1 and the contact 7c-1 and a line between the resistor 7a-2 and the contact 7c-2.

Figure 5:
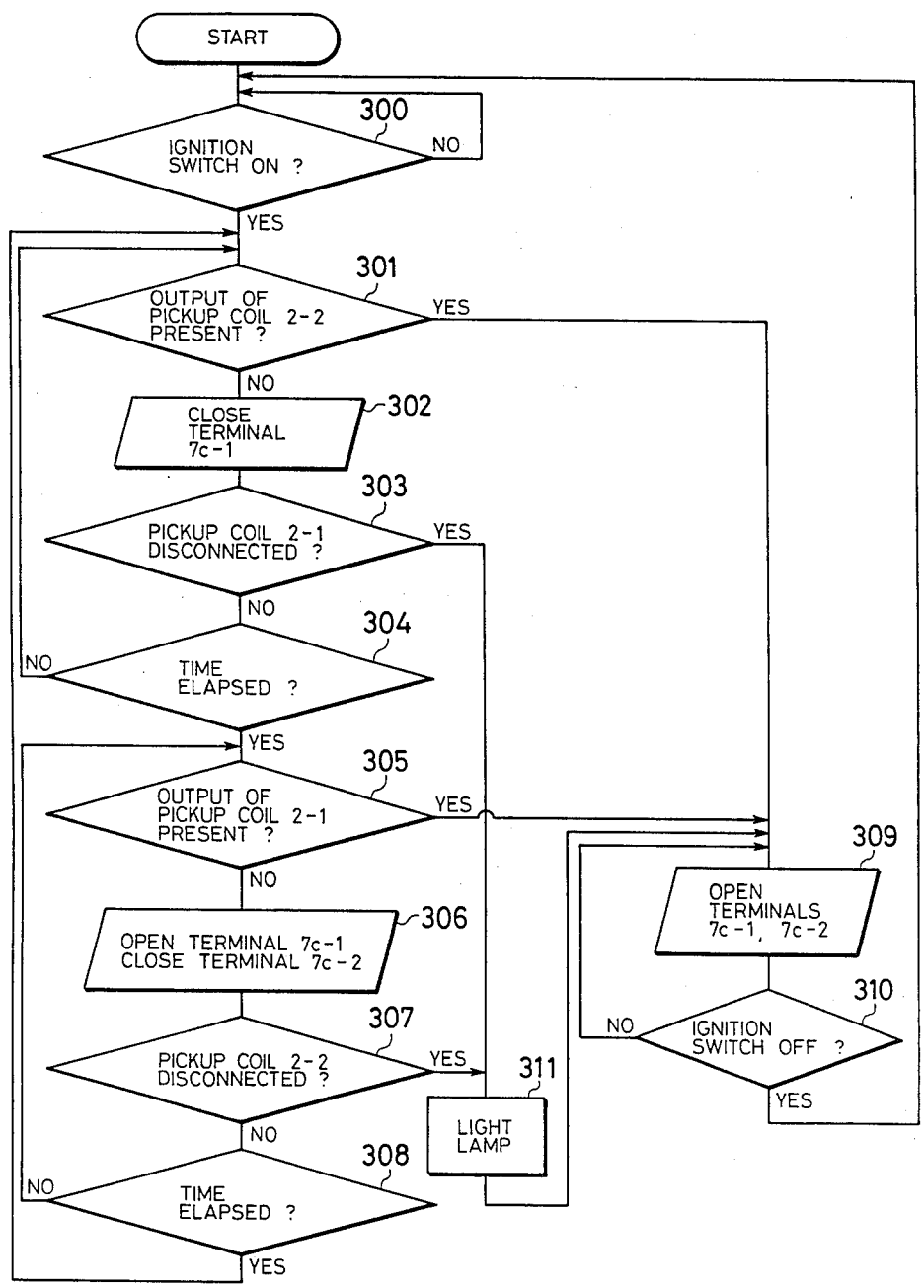
FIG. 5 is a flow chart of the program provided for the apparatus of FIG. 4.

FIG. 5 is a flow chart describing the programmed steps of the microcomputer 12 according to the second embodiment of the present invention.

In a step 300, the microcomputer checks whether the ignition switch 10 is switched to the on-condition. If the decision is YES indicating that the ignition switch 10 is in the on condition, a step 301 follows to check the presence of the output of the pickup coil 2-2 using waveform shaping circuit 6. If the output thereof is absent, control goes to a step 302 in which the switch 7b is operated to cause the contact 7c-1 to close, so that current flows through the resistor 7a-1 to the connector 1-1. If it is present, control goes to a step 309 in which the switch 7b is operated to cut off connection between the voltage regulator 13 and the connectors 1-1, 1-2, and then a step 310 is executed to check the condition of the ignition switch 10. If the ignition switch is in the off-condition, the operational flow returns to the step 300. If not, the microcomputer maintains the disconnection therebetween.

The step 302 is followed by a step 303 in which the microcomputer checks whether the pickup coil 2-2 is disconnected. If so, control goes through a step 311 for lighting a lamp to the step 309. If there is no disconnection, control proceeds to a step 304 to check the elapse of a predetermined time period. If the predetermined time period is not elapsed, the operational flow returns to the step 301. On the other hand, if the predetermined time period is elapsed without the decision of disconnection, a step 305 is executed to check the presence or absence of output of another pickup coil 2-1. If the output thereof is present, control goes to the step 309. If it is absent, a step 306 is executed such that the switch 7b is operated to cause current to flow through the other contact 7c-2 toward the pickup coil 2-2. The step 306 is followed by a step 307 in which a decision is made if the pickup coil 2-2 is disconnected. If the answer is YES that the pickup coil 2-2 is disconnected, the program proceeds to the step 311 and then goes to the step 309. If no, a step 308 follows to check the elapse of a predetermined time period. When the predetermined time period is not elapsed, the operational flow retuns to the step 305. On the other hand, when the predetermined time period is elapsed, the operational flow returns to the step 301.

Furthermore, as well as in the first embodiment, the microcomputer 12 monitors an abnormal operation of the switch 7b. If the switch 7b has been turned on irrespective of the presence of the output signal of the pickup coil 2-1 or 2-2, the microcomputer generates a signal indicative of the stop of control to be performed to the vehicle.

It should be understood that the foregoing relates to only preferred embodiments of the invention, and that it is intended to cover all changes and modifications of the embodiment of the invention herein used for the purpose of the disclosure, which do not constiue departures from the spirit and scope of the invention.

What is claimed is:

1. An apparatus for detecting a disconnection of a sensor which is connected through a connector, comprising:
   a microcomputer; first means, coupled to a signal-carrying line receiving an output signal of said sensor through said connector, for detecting in combination with said microcomputer, a presence or absence of said output signal of said sensor;
   second means coupled to said signal-carrying line, for causing a large current to flow through said connector to said sensor for a predetermined time period, in combination with said microcomputer in response to said absence of said output signal of said sensor, said large current being greater than a current of said output signal of said sensor, and of a magnitude to cause elimination of an oxide film produced on said connector; and
   third means, coupled to said signal-carrying line, for monitoring a signal in said signal-carrying line and determining, in combination with said microcomputer, a disconnection of said sensor in accordance with the result of said monitoring.

2. An apparatus as claimed in claim 1, wherein said microcomputer also detects an abnormal operation of said second means by monitoring the presence of the large current, after the elapse of said predetermined time period.

3. An apparatus as claimed in claim 1, wherein said microcomputer also detects a driving of said second means, and in response to the detection, for making null the output signal of said sensor with respect to a system operated on the basis of the output signal thereof.

4. An apparatus for detecting a disconnection of a rotational speed sensor connected to a connector in a motor vehicle, comprising:
   control means for detecting a turning-on of an ignition switch of said motor vehicle;
   first means coupled to a signal-carrying line receiving an output signal of said sensor through said connector, for causing a large current to flow through said connector to said sensor, said large current being a current which is greater than a current of the output signal of said sensor and is of a sufficient level to cause elimination of an oxide film produced on said connector;
   wherein said control means is also responsive to said turning-on of said ignition switch of said vehicle, for driving said first means to flow said large current through said connector for a predetermined time period from a time of said turning-on of said ignition switch; and
   second means coupled to said signal-carrying line for determining a disconnection of said sensor by monitoring a signal in said signal-carrying line during the driving of said first means.

5. An apparatus as claimed in claim 4, wherein said control means includes means for controlling said first means so that no current flows in response to a signal, from said second means, indicative of the disconnection of said sensor.

6. An apparatus as claimed in claim 4, wherein said control means includes means for detecting an abnormal operation of said first means by monitoring the presence of said large current after elapse of the predetermined time period and means responsive to the detection, for generating a signal indicative of an abnormality of said first means to discontinue control of said vehicle performed on the basis of the output signal of said sensor.

7. An apparatus for detecting a disconnection of first and second rotational speed sensors in a motor vehicle, said rotational speed sensors connected to a first and second connector respectively, comprising:
   first means, coupled to a first signal-carrying line receiving an output signal of said first sensor through said first connector and to a second signal-carrying line receiving an output signal of said second sensor through said second connector, for monitoring signals in said first and second signal-carrying lines;
   second means, coupled to said first and second signal-carrying lines, for causing a large current to flow through either of said first and second connectors to either of said first and second sensors, the large current being of a level greater than currents of the output signals of said first and second sensors and of a level to cause elimination of an oxide film produced on said first and second connectors; and
   control means for controlling said second means at a predetermined timing such that: a) said large current flows through said first connector to said first sensor for a first predetermined time period in response to an absence of said output signal of said second sensor, and b) the large current flows through said second connector to said second sensor for a second predetermined time period after the elapse of said first predetermined time period in the absence of said output signal of said first sensor.

8. An apparatus as claimed in claim 7, wherein said control means controls said second means to cause no current flow in response to a signal indicative of a disconnection from said first means.

9. An apparatus as claimed in claim 7, wherein said control means detects an abnormal operation of said second means by monitoring the conditions of the currents flowing through said first and second connectors and, in response to the detection, generate a signal indicative of the abnormality of said second means to discontinue control of said vehicle performed on the basis of the output signals of said first and second sensors.

* * * * *